United States Patent

[11] 3,610,864

| [72] | Inventor | Evgeny Vasilievich Kholodnov<br>ulitsa Vokzalnaya, 21, kv. 30, Fryazino<br>Moskovskoi Oblasti, U.S.S.R. |
|---|---|---|
| [21] | Appl. No. | 761,625 |
| [22] | Filed | Sept. 23, 1968 |
| [45] | Patented | Oct. 5, 1971 |
| [32] | Priority | Sept. 30, 1967 |
| [33] | | U.S.S.R. |
| [31] | | 1186984 |

[54] SPARK-ERODING MACHINE FOR MAKING APERTURES IN WORKPIECES MADE OF ELECTRICALLY CONDUCTING MATERIALS
1 Claim, 3 Drawing Figs.

| [52] | U.S. Cl. | 219/69 V |
|---|---|---|
| [51] | Int. Cl. | B23p 1/08 |
| [50] | Field of Search | 219/69 G, 69 E, 69 F, 69 V |

[56] References Cited
UNITED STATES PATENTS
3,495,258  2/1970  Kholodnov et al............  219/69 V

*Primary Examiner*—R. F. Staubly
*Attorney*—Waters, Roditi, Schwartz & Nissen

ABSTRACT: A machine for spark-erosion machining of current-conducting materials by means of a wire used as the tool electrode, in which the wire electrode is displaced by means of a crank gear circumferentially, and along straight lines disposed at various angles in relation to each other; and in which the workpiece is displaced relative to the crank gear by a coordinate table in two mutually perpendicular directions. These displacements are made in the controlled feed mode which makes it possible to cut orifices representing any possible combination of straight lines and circumferences.

SPARK-ERODING MACHINE FOR MAKING APERTURES IN WORKPIECES MADE OF ELECTRICALLY CONDUCTING MATERIALS

The present invention relates to the spark-erosion machines for making apertures in workpieces made of current-conducting materials with a nonprofiled tool electrode made of wire. The invention may be used most effectively for making apertures of complex shape representing any possible combination of straight lines, circumferences and circumferencial arcs and also for making apertures representing circumferences, all with a high degree of shape accuracy and coordinate position precision. Disclosed in U.S. Pat. No. 3,495,258 of Feb. 10, 1970, is a machine comprising a coordinate work table including two carriages adapted to travel in perpendicular directions, the first carriage travelling in a transverse direction, and the second carriage travelling in a longitudinal direction, said machine further comprising a device for releasably securing a workpiece to be treated by said machine, carried by said first carriage travelling in the transverse direction, and a device for guiding an eroding electrode tool, said last-mentioned device including a U-shaped bracket carried by the connecting rod of a crank mechanism. The pin of the crank is adjustably and movably connected to the arm of the crank. This adjustable and movable connection includes a slide block adapted to slide along guideways provided in said crank arm, said slide block having said crank pin rigidly attached thereto.

This construction of the crank mechanism disclosed in the aforementioned U.S. patent does not provide for making apertures having their peripheral walls constituted by planar portions disposed at various angles in relation to each other, which fact puts certain limitations to the practical applications of the machine.

It is an object of the present invention to eliminate above-mentioned disadvantage.

The present invention has for its aim a further improvement of a spark-eroding machine, which should extend the facilities of such machine in making apertures of various configurations by spark-eroding technique, such as, for example, apertures in nozzles for making artificial fibers.

This aim is attained in a spark-eroding machines for making apertures in workpieces made of electrically conducting materials, in which machine, according to the present invention, said pin of said crank is rigidly secured to a first slide movably carried by a second slide, said second slide, in its turn, being movably carried by a part rigidly secured to the driving shaft of said crank mechanism; said two slides being movable in perpendicular directions under the action of their respective actuating mechanisms which are controlled to ensure desired electrodischarge machining parameters.

A spark-eroding machine, embodying the present invention, offers a wide range of practical applications and features a reliable and facilitated operation.

The present invention will be better understood from the following description of an embodiment thereof, due reference being made to the accompanying drawings, in which.

Figure 1:
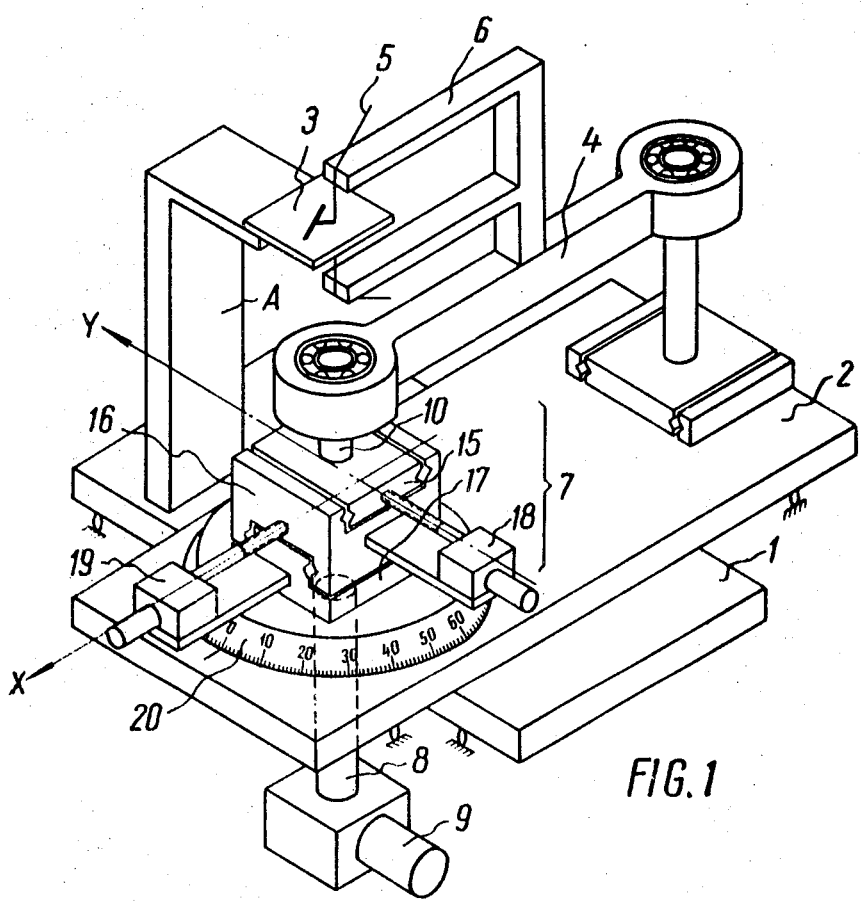
FIG. 1 shows schematically the arrangement of the carriages of the coordinate worktable, the device for securing a workpiece to be treated, the apparatus for guiding the electrode tool and the slides of the crank mechanism of a machine, embodying the present invention.

Referring now to the drawings, a spark-eroding machine for making apertures in workpieces made of electrically conducting materials by means of an electrode tool, comprises a coordinate worktable including two carriages: the first carriage 1 (FIG. 1) travelling in the transverse direction and the second carriage 2 travelling in the longitudinal direction; a device designated generally by the letter A in FIG. 1, for releasably securing a workpiece 3 to be treated by the machine, the device A being rigidly attached to the transverse carriage 1; a crank mechanism with a connecting rod 4 and an apparatus for guiding the electrode tool (the electrode wire) 5, including a U-shaped bracket 6 attached to the connecting rod 4.

The connecting rod 4 is driven by the crank assembly 7 of which the shaft 8 is rotated by the control drive 9. The motion of the connecting rod 4 is responsible for the motion of the electrode tool 5 in relation to the workpiece 3. The U-shaped bracket 6 is so disposed on the connecting rod 4 that the electrode tool 5 is coaxial with the pin 10 of the crank 7.

The pin 10 is connected to the arm of the crank assembly 7 by means of two slides 15 and 16, with the pin 10 being rigidly attached to the slide 15 and carried thereby. The slide 15 is mounted for linear motion on the slide 16 which, in turn, is mounted for linear motion on a base part 17 rigidly attached to the driving shaft 8 of the crank assembly 7. The directions of the linear motion of the slides are perpendicular to each other, the slides 15 and 16 being actuated by their respective control actuators 18 and 19.

The base part 17 carries a dial 20 calibrated in angles of rotation, which provides for setting the slides 15 and 16 for motion at desired angles in relation to the directions of the travel of the carriages 1 and 2 of the work table.

Other units of the machine herein described: the power source, the electric pulse generator, the device for measuring the coordinates of the carriages 1 and 2, the system for feeding and tensioning the electrode wire 5, the control drives of the worktable, the working-fluid-circulating system — are neither shown nor particularly described here, since their construction is irrelevant to the particular features of the present invention and is well known to specialists in the art.

Figure 2:
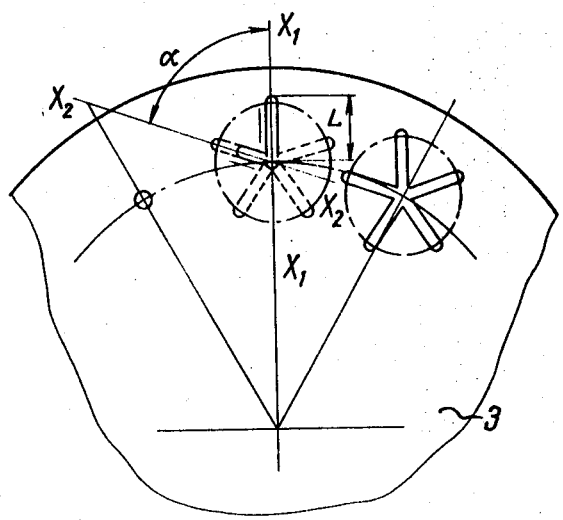
FIG. 2 shows an exemplary workpiece with apertures made by a machine embodying the invention.

Apertures of complicated configurations are made on a machine, embodying the present invention, as follows:

A workpiece 3 (FIG. 2) to be treated is secured on the device A (FIG. 1) in any known manner. The slides 15 and 16 are set, for the crank pin 10 to be coaxial with the driving shaft 8 of the crank assembly 7.

The electrode tool 5 is threaded through an auxiliary opening which has been made previously in the workpiece 3, with the electrode being properly tensioned and fed in the longitudinal direction thereof.

The corresponding calculating devices of any one of the several known constructions, responsive to the actual positions of the carriages 1 and 2 of the worktable in a coordinate system, are used to establish the coordinates of the centerline of the electrode tool 5 positioned at the center of the auxiliary opening. Then (after the pulse generator has been switched on and the workpiece 3 has been submerged in the working liquid in any known manner), the control drive of the longitudinal carriage 16 is operated to cut an elongate slot in the workpiece 3, the length of the slot being equal to L (FIG. 2), and the slot being directed along the line $X_1 - X_1$ (the length of the slot is measured from the established center of the opening).

After the end of the slot, corresponding to a calculated coordinate, has been reached, the carriage 16 (FIG. 1) is returned into its initial position, the base part 17 is rotated by the angle $\alpha$ (FIG. 2), and another elongate slot equal to L is cut along the line $X_2 - X_2$. Then the carriage 16 (FIG. 1) is once more returned into its initial position, and so on, until the aperture is made.

After the cutting of the aperture has been completed, the electrode tool (the Wire) 5 is broken. For making a successive aperture, the guiding apparatus 6 for the electrode tool 5 is moved in relation to the workpiece 3 by a distance, corresponding to the spacing between the apertures to be made; and the above-described sequence of operations is repeated.

Figure 3:
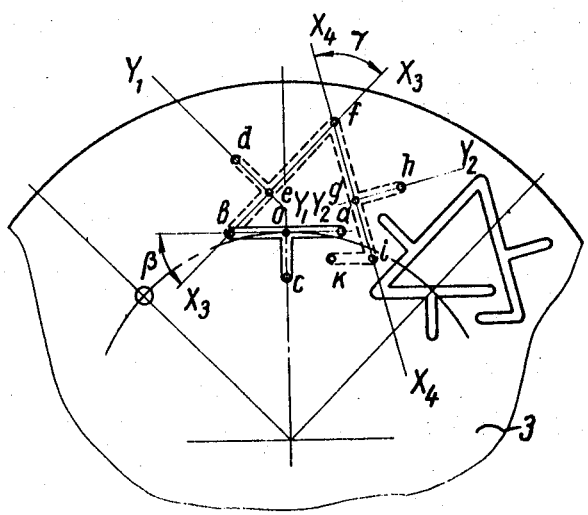
FIG. 3 shows another workpiece with apertures made by a spark-eroding machine embodying the present invention.

Apertures in a workpiece shown in FIG. 3 are made in a somewhat different manner.

The electrode tool 5 is threaded into one of the auxiliary openings O (FIG. 3), the base part 17 (FIG. 1) having been previously rotated through an angle equal to $\beta$ in relation to the direction of travel of the transverse carriage 1 (FIG. 1) and the centerline of the pin 10 having been displaced in relation to the driving shaft 8 of the crank assembly 7 along the line $X_3 - X_3$ (FIG. 3) by a distance equal to $fb$, the slide 15, FIG. 1, is displaced along the direction of the slot to be cut from the point $f$, FIG. 3, to the point $b$.

First, the portions OC and $aob$ are cut by displacing the transverse carriage 1 (FIG. 1) and the longitudinal carriage 2 (FIG. 1) of the worktable. When the electrode tool 5 reaches the point $b$ (FIG. 3), the portions $bf$ and $ed$ are eroded, by means of the corresponding displacement of the slides 15 and 16 (FIG. 1) along the lines $X_3 - X_3$ (FIG. 3) and $Y_1 - Y_2$, respectively. The cutting of these portions is completed, when the electrode tool 5 (FIG. 1) reaches the point $F$ (FIG. 3). At this moment the centerline of the pin 10 (FIG. 1) is once again aligned with the central axis of the driving shaft 8 of the crank assembly 7. Consequently, the base part 17 can be rotated through the angle $\gamma$ (FIG. 3), without the electrode tool 5 (FIG. 1) being displaced in relation to the workpiece 3. Then the portions $fi$ (FIG. 3) and $gh$ of the aperture to be made are cut by means of the slides 15 (FIG. 1) and 16 being displaced, respectively, along the lines $Y_2-Y_2$ (FIG. 3) and $X_4-X_4$. The last portion $ik$ of the aperture is cut with the transverse carriage 1 (FIG. 1) being displaced correspondingly, whereafter the electrode tool (the wire) 5 is broken and moved in relation to the workpiece 3 toward the next aperture to be cut, the sequence of operations then being repeated.

A machine embodying the present invention can make apertures having other configurations than the ones described above, such as, for example, apertures in the form of spirals.

It should be understood that the above-described structure of a spark-eroding machine is but one of the many possible embodiments of the present invention. Various modifications, as regarding the shape, the size, and the arrangement of the constituent parts of the machine, may take place without departing from the spirit and scope of the present invention, as set forth in the claims to follow.

What is claimed is:

1. A machine for spark-erosion cutting of complex shape apertures in workpieces constituted of current-conducting materials with a tool electrode, said machine comprising a coordinate table including two carriages displaceable in mutually perpendicular directions; means for holding the workpiece under processing rigidly fixed on one of said carriages of the coordinate table; a crank gear mounted on the second carriage of said coordinate table, said crank gear comprising two slides displaceable in two mutually perpendicular directions, said crank gear including a pin fixed to one of the said slides and a shaft parallel to said pin, the second slide having a base rigidly connected to the shaft of the said crank gear; a connecting arm set onto the pin and slidably connected to said second carriage and supporting said tool electrode; means for directing the tool electrode mounted on the connecting arm of said crank gear so that the said tool electrode and the said pin are coaxial; and controlling drives providing the desired parameters of the spark-erosion process and adapted for displacing said two carriages of the coordinate table and said two slides and said shaft of the crank gear so that the tool electrode and the workpiece being processed displace relative to one another along a trajectory representing a combination of straight lines, circumferences and circumferential arcs.

UNITED STATES PATENT OFFICE
CERTIFICATE OF CORRECTION

Patent No. 3,610,864          Dated October 5, 1971

Inventor(s) EVGENY VASILIEVICH KHOLODNOV, ET. AL.

It is certified that error appears in the above-identified patent and that said Letters Patent are hereby corrected as shown below:

On the cover sheet [72], after "Evgeny Vasilievich Kholodnov", insert -- Nikolai Vasilievich Lomov and Viktor Abramovich Katsman -- .

Signed and sealed this 22nd day of January 1974.

(SEAL)
Attest:

EDWARD M. FLETCHER, JR.          RENE D. TEGTMEYER
Attesting Officer                Acting Commissioner of Patents